United States Patent
Iyer et al.

(10) Patent No.: US 10,113,937 B2
(45) Date of Patent: Oct. 30, 2018

(54) SYSTEM AND METHOD FOR MONITORING HOOK WEAR IN A GAS TURBINE ENGINE

(71) Applicant: Siemens Energy, Inc., Orlando, FL (US)

(72) Inventors: Arun Meenakshinatha Iyer, Charlotte, NC (US); Dustin C. Boudin, Belmont, NC (US); Clifford Hatcher, Jr., Orlando, FL (US)

(73) Assignee: SIEMENS ENERGY, INC., Orlando, FL (US)

( * ) Notice: Subject to any disclaimer, the term of this patent is extended or adjusted under 35 U.S.C. 154(b) by 0 days.

(21) Appl. No.: 15/448,645

(22) Filed: Mar. 3, 2017

(65) Prior Publication Data

US 2018/0252617 A1    Sep. 6, 2018

(51) Int. Cl.
- *G01M 15/14* (2006.01)
- *F01D 21/00* (2006.01)
- *F01D 11/00* (2006.01)

(52) U.S. Cl.
CPC ............. *G01M 15/14* (2013.01); *F01D 11/00* (2013.01); *F01D 21/003* (2013.01)

(58) Field of Classification Search
USPC ........................................ 73/112.01, 112.05
See application file for complete search history.

(56) References Cited

U.S. PATENT DOCUMENTS

| | | | |
|---|---|---|---|
| 7,207,768 B2 | 4/2007 | Gordon et al. | |
| 7,758,301 B2 | 7/2010 | Van Heusden et al. | |
| 7,861,592 B2 | 1/2011 | Twerdochlib | |
| 8,632,300 B2 | 1/2014 | Rogers et al. | |
| 8,662,016 B2 | 1/2014 | Wiebe | |
| 8,864,446 B2 | 10/2014 | Singh et al. | |
| 8,920,116 B2 | 12/2014 | Wiebe et al. | |
| 9,057,710 B2 | 6/2015 | Hatcher et al. | |
| 9,681,107 B2* | 6/2017 | Hatcher, Jr. | H04N 7/183 |
| 9,708,927 B2* | 7/2017 | Hatcher, Jr. | F01D 21/06 |
| 9,778,141 B2* | 10/2017 | Bancalari | G01M 15/02 |
| 2006/0159547 A1* | 7/2006 | Gordon | F01D 21/04 415/118 |
| 2015/0092039 A1* | 4/2015 | Ruhge | G01B 21/16 348/82 |
| 2015/0300920 A1* | 10/2015 | DeAscanis | G01M 15/14 356/614 |
| 2016/0012576 A1 | 1/2016 | Hatcher, Jr. et al. | |
| 2016/0330351 A1* | 11/2016 | DeAscanis | H04N 5/2251 |

* cited by examiner

*Primary Examiner* — Eric S McCall (57) ABSTRACT

A system and method for monitoring a gap size of a gap between a seal holder and an adjacent disk in a compressor section of a gas turbine. An imaging device is used to generate at least one image of the gap, wherein a calibration image of the gap is generated when the gas turbine is in a cold state to provide a calibration gap size. An operational image of the gap is also generated when the gas turbine is in operation to provide an operational gap size. In addition, an enclosure that houses the imaging device is attached to an access port formed in the compressor section to provide a view of the gap for the imaging device. Wear is detected in a hook section of the compressor section when the operational gap size is less than the calibration gap size.

20 Claims, 10 Drawing Sheets

SYSTEM AND METHOD FOR MONITORING HOOK WEAR IN A GAS TURBINE ENGINE

FIELD OF THE INVENTION

This invention relates to monitoring hook wear in a gas turbine engine, and more particularly, to monitoring a gap size of a gap between a seal holder and an adjacent disk in a compressor section of a gas turbine by generating a calibration image of the gap when the gas turbine is in a cold state to provide a calibration gap size and an operational image of the gap when the gas turbine is in operation to provide an operational gap size and wherein wear is detected in the hook section when the operational gap size is less than the calibration gap size.

BACKGROUND OF THE INVENTION

A gas turbine engine generally comprises a compressor section, a combustion section and a turbine section. The combustion section includes a plurality of combustors arrayed about the combustion section that are in fluid communication with a combustion section interior. The compressor section includes a series of stages, each stage including a row of stationary stator vanes and a row of rotating blades, used to compress air in order to provide a compressed air flow to the combustion section. In the combustion section, the air is mixed with a fuel, such as natural gas, and ignited to create a hot working gas. The turbine section includes a plurality of turbine blades arranged in a plurality of rows. The hot gas expands through the turbine section where it is directed across rows of blade assemblies by associated stationary vanes. The blade assemblies are attached to a rotatable shaft. As the hot gas passes through the turbine section, the gas causes the blades and thus the shaft to rotate, thereby providing mechanical work.

Figure 1:
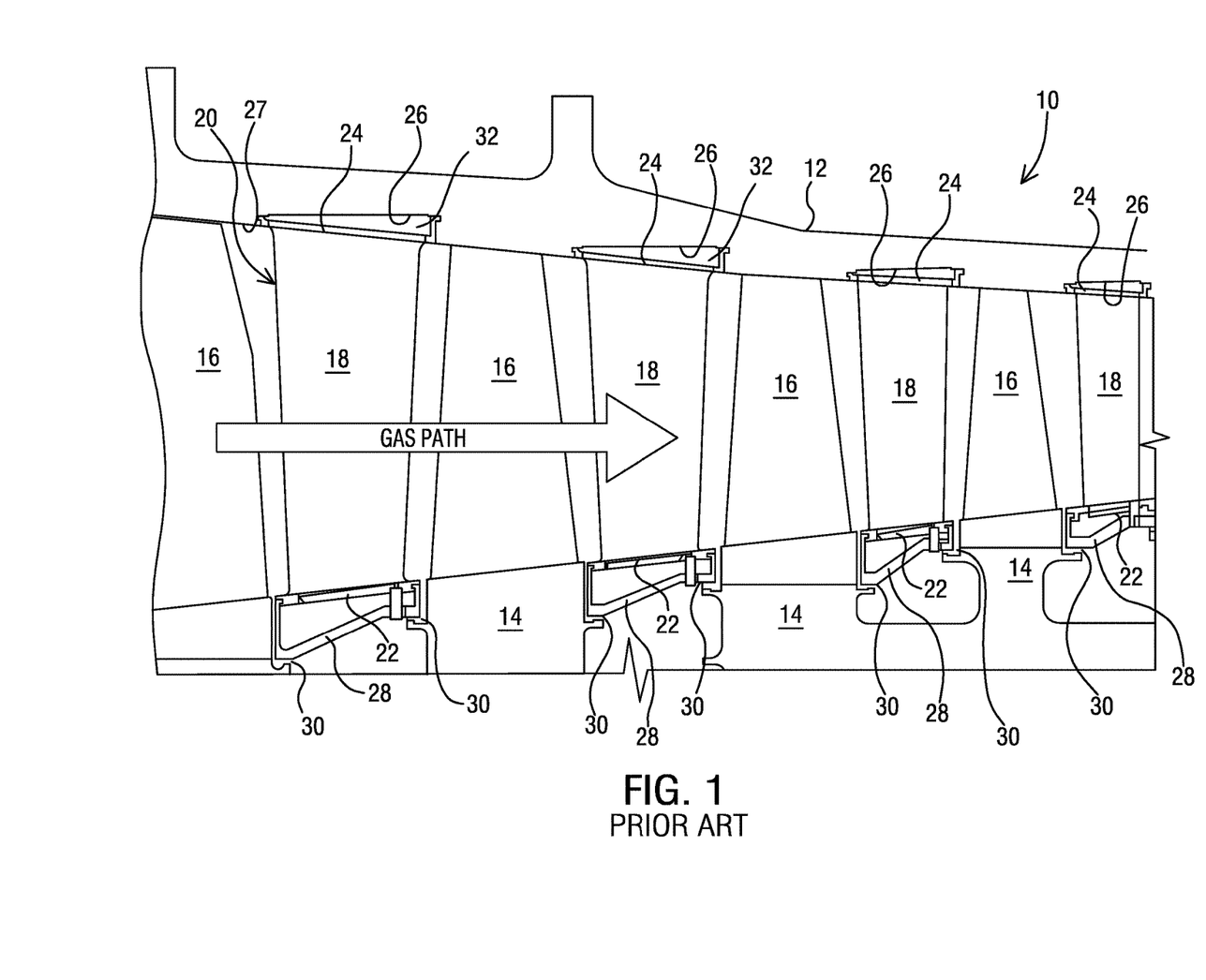
FIG. 1 is a cross-sectional view through a portion of a prior compressor section of a turbine engine.

An exemplary compressor section 10 is shown in FIG. 1. The compressor section 10 may be housed within a turbine outer casing or shell 12. The outer casing 12 may include two generally semi-cylindrical halves that are secured together. The outer casing 12 encloses, among other things, a rotor having a plurality of disks 14 that extend radially outward therefrom. A plurality of airfoils or blades 16 is mounted on each disk 14 to form a row. The rows of blades 16 alternate with rows of stationary airfoils or vanes 18. In some instances, the vanes 18 may be provided in the form of a diaphragm 20. Each diaphragm 20 may include inner 22 and outer 24 radial bands or shrouds, with a plurality of vanes 18 circumferentially arrayed therebetween. The diaphragm 20 may also be made of two substantially semi-circular halves similar to the outer casing 12. In addition, the outer casing 12 may include a circumferential slot or outer hook 26 along its inner peripheral surface 27 for receiving projecting elements 32 of the outer shroud 24 so as to attach the diaphragm 20 to the outer casing 12.

Figure 2:
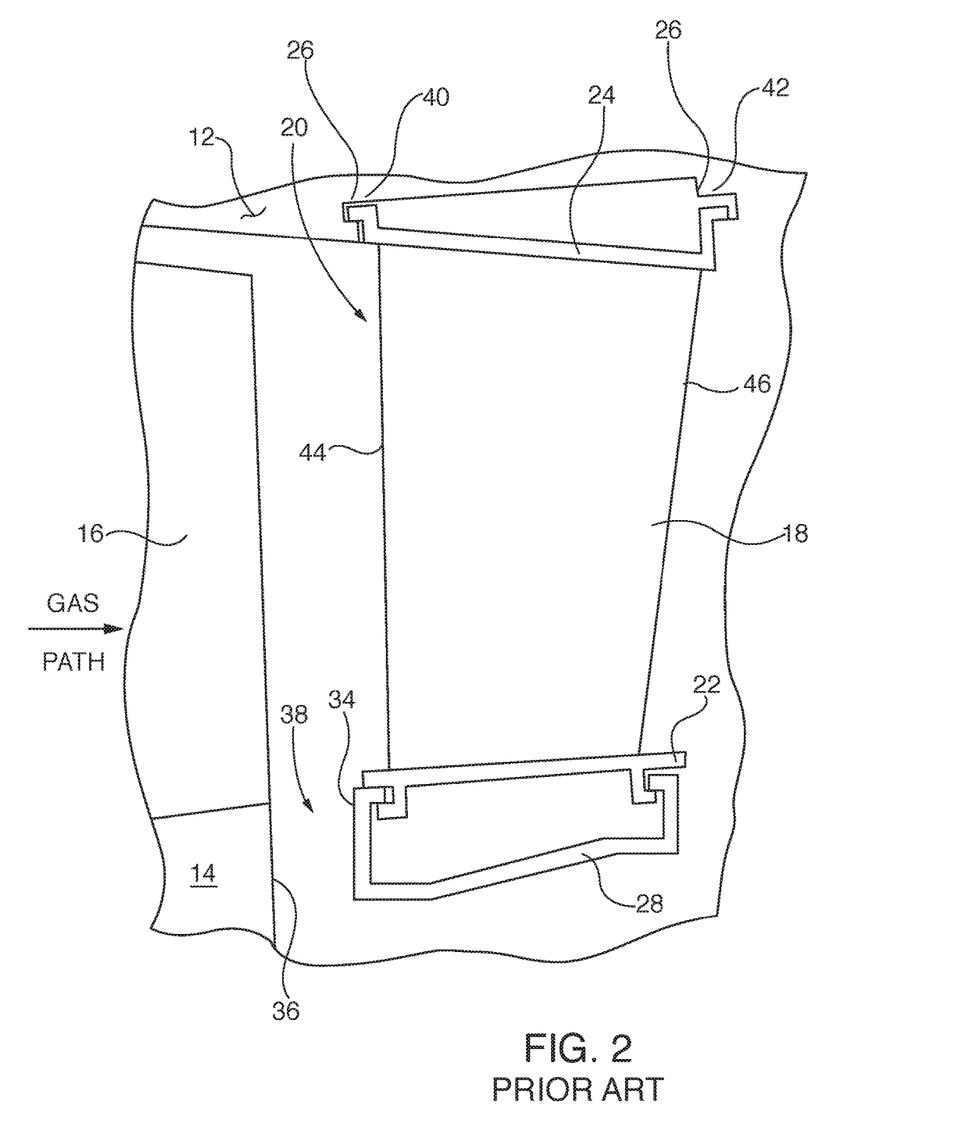
FIG. 2 is a cross-sectional close-up view depicting a gap between an adjacent rotating blade and stationary vane.
Figure 3:
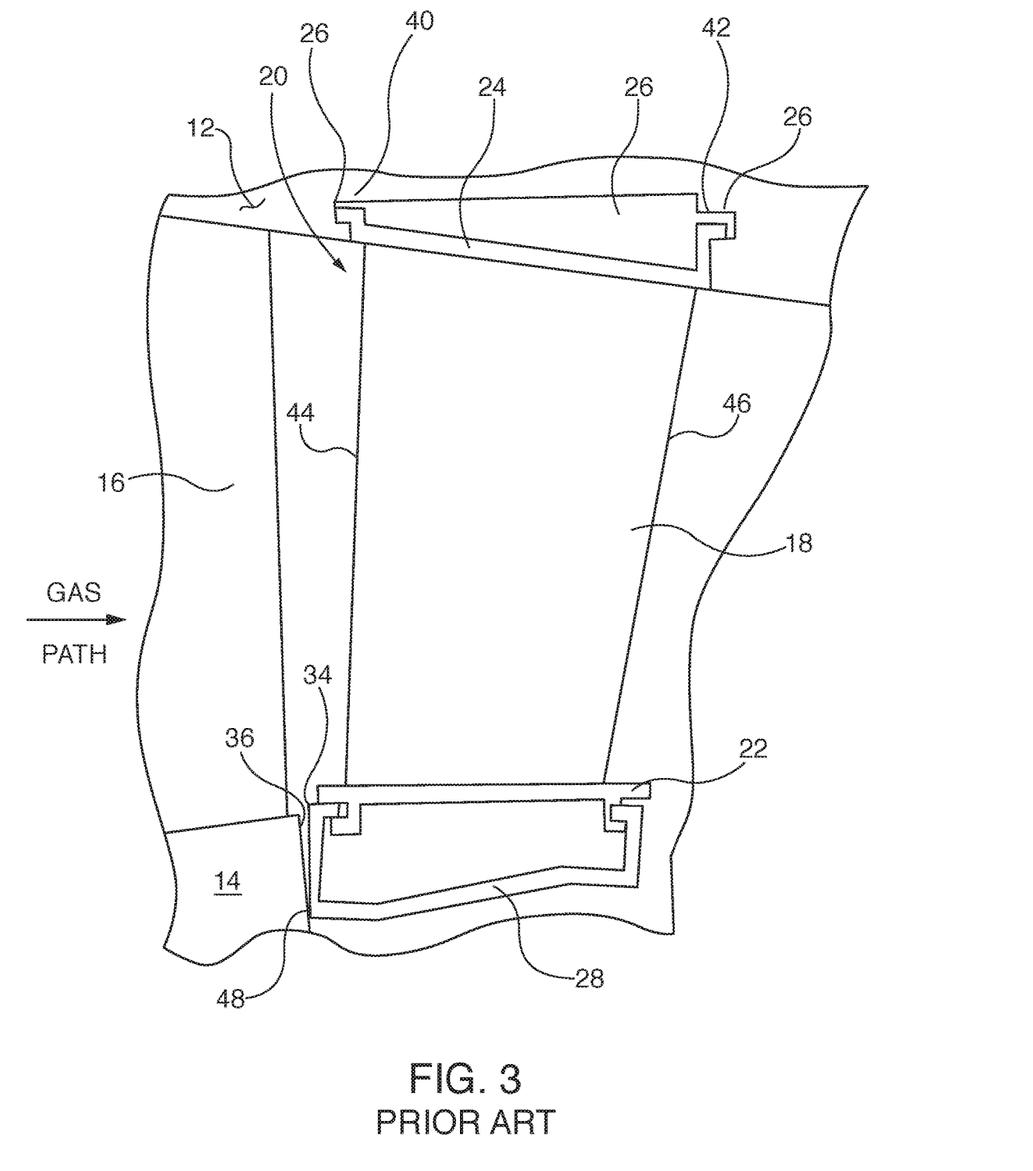
FIG. 3 is a cross-sectional close-up view of an adjacent rotating blade and stationary vane, showing the seal holder in contact with the rotor disk.

Referring to FIG. 2 in conjunction with FIG. 1, a seal holder 28 may be attached to the inner shroud 22 of the diaphragm 20. One or more seals 30 may extend from the seal holder 28. One or more surfaces of a seal holder 28, such as an upstream face 34, is spaced apart from a downstream face 36 of an adjacent disk 14 by a gap 38. During operation, at least one area or region of the outer hook 26 becomes worn (i.e. either upstream 40 or downstream 42 wear regions or both). This causes the seal holder 28 to move upstream due to the pressure difference between leading 44 and trailing 46 edges of an associated vane 18. As a result, an upstream gap 38 between the vane 18 and an upstream disk 14 reduces over time as wear occurs which may ultimately result in undesirable contact 48 (see FIG. 3) between the seal holder 28 and the 14 disk and thus possible damage to the disk 14, the seal holder 28 and/or the compressor section 10.

In order to avoid such damage, the hook wear regions 40, 42 and associated interfaces/components are visually inspected in order to assess the level of wear that has occurred during gas turbine operation. The inspection occurs at periodic intervals at which time the gas turbine is shut down. Visual inspection of hook wear requires removing a turbine cover (i.e. performing a cover lift) or disassembly of other portions of the gas turbine to provide access to the hook wear regions 40, 42 and associated components. Typically, an inspection/service team visually inspects the outer hook 26 to determine a level of functionality of the outer hook 26 (level of wear, whether there are any cracks, assessment of coating quality etc. if any) and provide an estimate of the remaining life of the outer hook 26 and other components. Depending on the level of wear, parts or components may need to replaced or repaired. However, such visual inspections are labor intensive, time consuming and expensive and typically occur during a scheduled maintenance after a predetermined time period or during a major site outage. Thus, information regarding component wear rates during other time periods, for example, initial wear rates early in an operating schedule, are not available.

SUMMARY OF INVENTION

A system is disclosed for monitoring a gap size of a gap between a seal holder and an adjacent disk in a compressor section of a gas turbine wherein the compressor section includes a hook section. The system includes an imaging device that generates at least one image of the gap. A calibration image of the gap is generated when the gas turbine is in a cold state to provide a calibration gap size. In addition, an operational image of the gap is generated when the gas turbine is in operation to provide an operational gap size wherein wear is detected in the hook section when the operational gap size is less than the calibration gap size. The system also includes an enclosure that houses the imaging device wherein the enclosure includes an attachment portion. Further, the system includes an access port formed in the compressor section to provide a view of the gap for the imaging device, wherein the attachment portion is attached to the access port.

In addition, a method is disclosed for monitoring a gap size of a gap between a seal holder and an adjacent disk in a compressor section of a gas turbine. The method includes measuring the gap between the seal holder and the disk when the gas turbine is in a cold state to provide a calibration gap size. The method also includes generating an image of the gap when the gas turbine is in a cold state to provide a calibration image of the gap size. Next, the method includes correlating a number of pixels in the calibration image to the calibration gap size to determine a calibration scale value. In addition, the method includes generating a plurality of successive operational images of the gap over time during operation of the gas turbine. Further, the method includes determining an operational gap size for each operational image by using the calibration scale value and determining whether the operational gap size is less than the calibration gap size.

Those skilled in the art may apply the respective features of the present invention jointly or severally in any combination or sub-combination.

BRIEF DESCRIPTION OF DRAWINGS

The teachings of the present disclosure can be readily understood by considering the following detailed description in conjunction with the accompanying drawings, in which.

To facilitate understanding, identical reference numerals have been used, where possible, to designate identical elements that are common to the figures.

DETAILED DESCRIPTION

Although various embodiments that incorporate the teachings of the present disclosure have been shown and described in detail herein, those skilled in the art can readily devise many other varied embodiments that still incorporate these teachings. The scope of the disclosure is not limited in its application to the exemplary embodiment details of construction and the arrangement of components set forth in the description or illustrated in the drawings. The disclosure encompasses other embodiments and of being practiced or of being carried out in various ways. Also, it is to be understood that the phraseology and terminology used herein is for the purpose of description and should not be regarded as limiting. The use of "including," "comprising," or "having" and variations thereof herein is meant to encompass the items listed thereafter and equivalents thereof as well as additional items. Unless specified or limited otherwise, the terms "mounted," "connected," "supported," and "coupled" and variations thereof are used broadly and encompass direct and indirect mountings, connections, supports, and couplings. Further, "connected" and "coupled" are not restricted to physical or mechanical connections or couplings.

The disclosures of U.S. Pat. No. 9,057,710, issued. Jun. 16, 2015, entitled SYSTEM AND METHOD FOR AUTOMATED OPTICAL INSPECTION OF INDUSTRIAL GAS TURBINES AND OTHER POWER GENERATION MACHINERY to Clifford Hatcher et al. and assigned to SIEMENS ENERGY, INC., U.S. Pat. No. 7,861,592, issued Jan. 4, 2011, entitled BLADE SHROUD VIBRATION MONITOR to Michael Twerdochlib and assigned to SIEMENS ENERGY, INC. and U.S. Pat. No. 7,207,768 issued Apr. 24, 2007 to Thomas J. Gordon, et al. and assigned to SIEMENS ENERGY, INC. are each incorporated by reference in their entirety.

Figure 4:
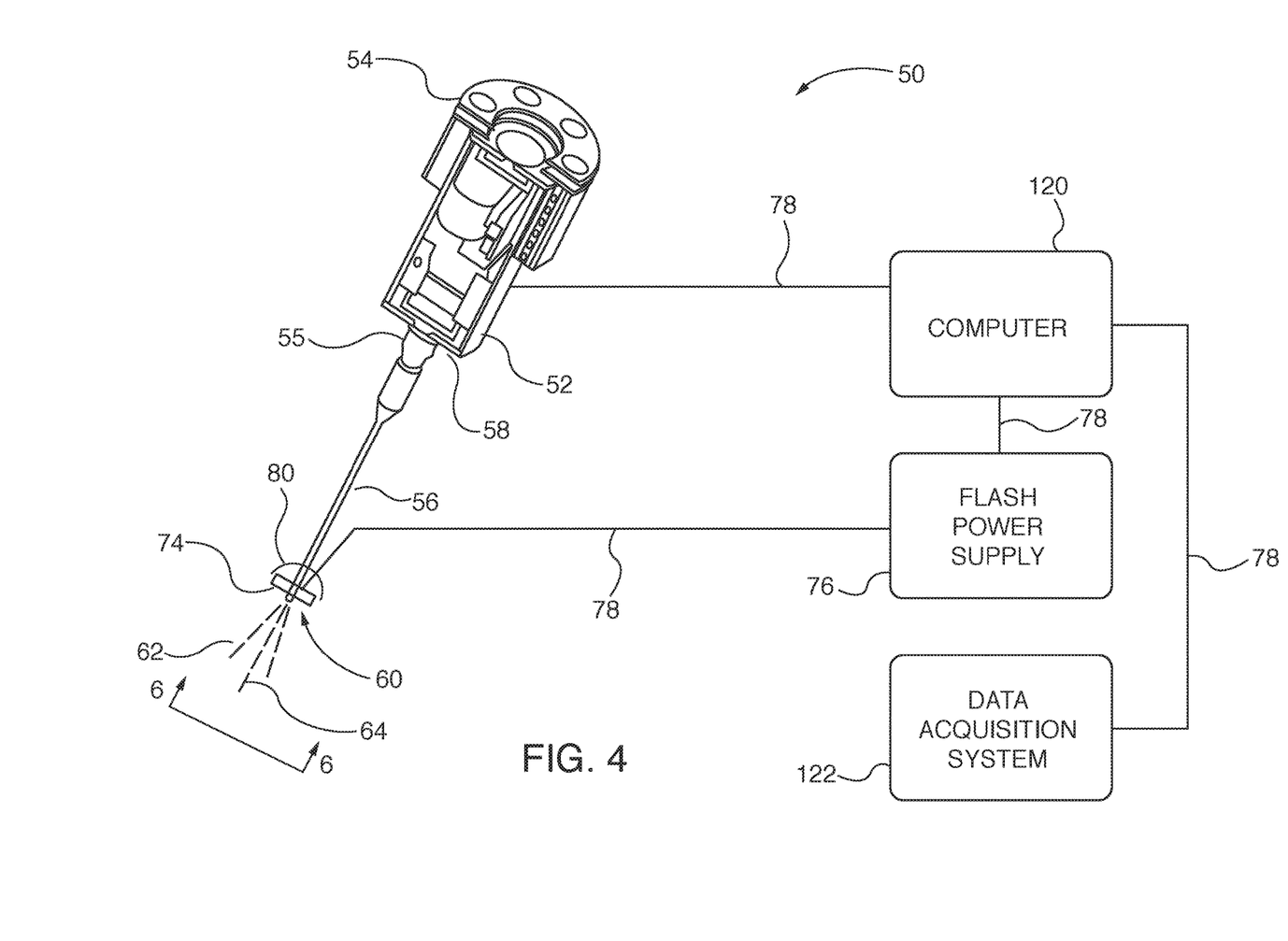
FIG. 4 depicts an imaging device in accordance with an embodiment of the present invention.

Referring to FIG. 4 an imaging device 50 in accordance with an embodiment of the present invention is shown. The device 50 includes a camera 52 such as a high resolution digital camera for generating or capturing digital images of the gap 38. In an embodiment, the camera 52 may be of the type available from Teledyne DALSA, Waterloo, ON, Canada. The camera 52 is housed in an enclosure 54 having an attachment portion 55 that is attached to a custom access port as will be described.

Figure 5:
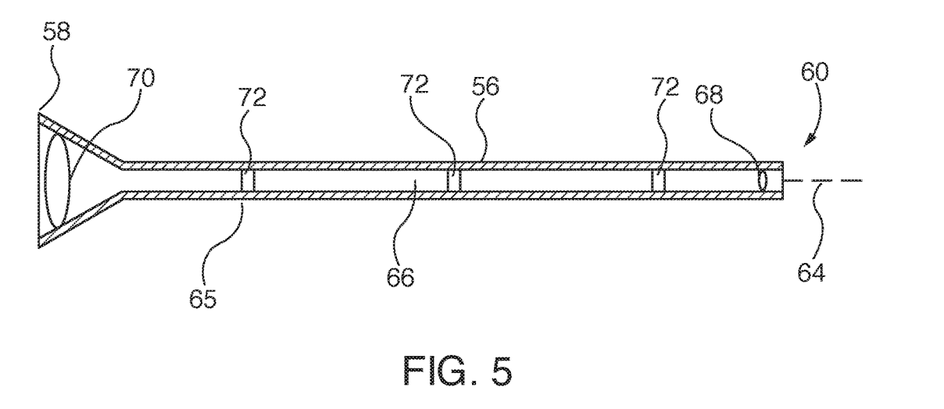
FIG. 5 is a cross sectional side view of an optional borescope used in conjunction with the imaging device of FIG. 4.

In an embodiment, the device 50 may include an optional borescope 56 having a sensor end 58 that is attached to the camera 52 and a viewing end 60 that provides a field of view 62 for the camera 52. Referring to FIG. 5, a cross sectional side view of the borescope 56 is shown. The borescope 56 includes a rigid tube 65 having a longitudinal axis 64 and an interior hollow portion 66 that extends through the tube 65 between the sensor end 58 and the viewing end 60. A first lens 68 is located in the viewing end 60 and a second lens 70 at the sensor end 58 that is adjacent the camera 52. In an embodiment, the first 68 and second 70 lenses are each objective lenses although it is understood that other types of lenses may be used. Further, the first lens 68 may be a different type of lens than the second lens 70. In addition, the borescope 56 may include additional lenses such as least one relay lens 72 or other suitable lens or optical device (i.e. prism, mirror) or combination thereof to ensure that light reflected from a turbine component being images is transmitted from the viewing end 60 to the camera 52. In an alternate embodiment, the tube 65 is flexible.

Referring back to FIG. 3, the viewing end 60 of the borescope 56 includes a flash source 74 that illuminates at least one gas turbine component or work piece being imaged. In an embodiment, the flash source 74 is a flash tube although it is understood that other types of flash sources may be used. The flash source 74 is energized by a flash power supply 76 via an electrical connection 78 that may include wires or cables. Alternatively, the flash source 74 may be energized wirelessly. Light reflected from a gas turbine component being imaged is then transmitted through the first lens 68, the relay lenses 72 and second lens 70 and is detected by the camera 52. The camera 52 is configured to capture digital images of the gas turbine component. Further, the borescope 56 may include a reflector 80 located on the viewing end 60 for directing and concentrating the light from the flash source 74 in a desired direction toward the gas turbine component.

Figure 6:
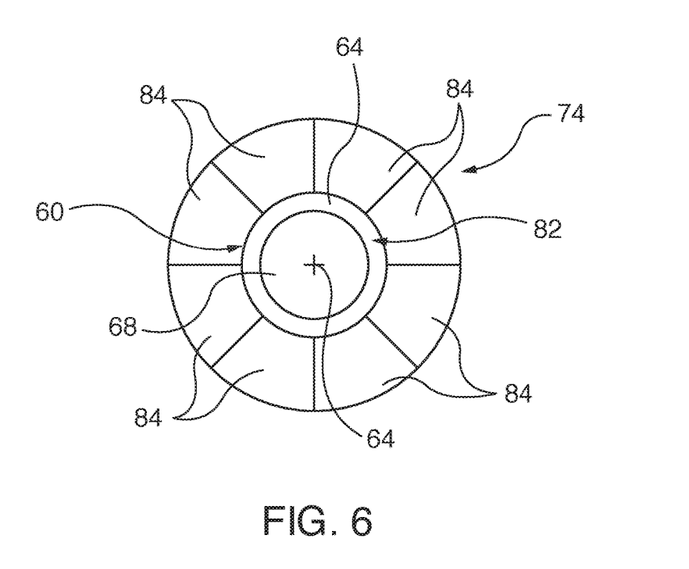
FIG. 6 depicts a viewing end of the borescope along view line 6-6 of FIG. 4 and illustrates a flash source.

FIG. 6 depicts the viewing end 60 of the borescope 56 along view line 6-6 of FIG. 4. The flash source 74 may have an annular shape including a central aperture 82 that receives the viewing end 60. In an alternate configuration, the flash source 60 may be comprised of a plurality of annular sectors 84. It is understood that other types of flash sources may be used such as white light emitting diodes.

Figure 7:
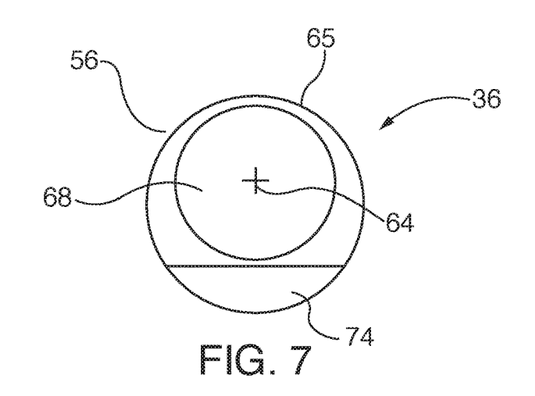
FIG. 7 depicts a flash source for use with an infrared camera.

In an alternate embodiment, the camera 52 is an infrared (IR) camera such as a digital single lens reflex (D-SLR) camera although it is understood that other types of IR cameras may be used. By way of example, the IR camera may be of the type available from FLIR Systems, Boston, Mass., US and is configured to capture IR images of internal portions of compressor section 10. Referring to FIG. 7, the flash source 74 for the IR camera is located underneath the first lens 68 although it is understood that the flash source 74 may be positioned in other locations relative to the first lens 68 such as above or on a side of the first lens 68. Further, the flash source 74 may emit a light pulse that is oriented along the longitudinal axis 64 or substantially transverse to the longitudinal axis 64.

Figure 8:
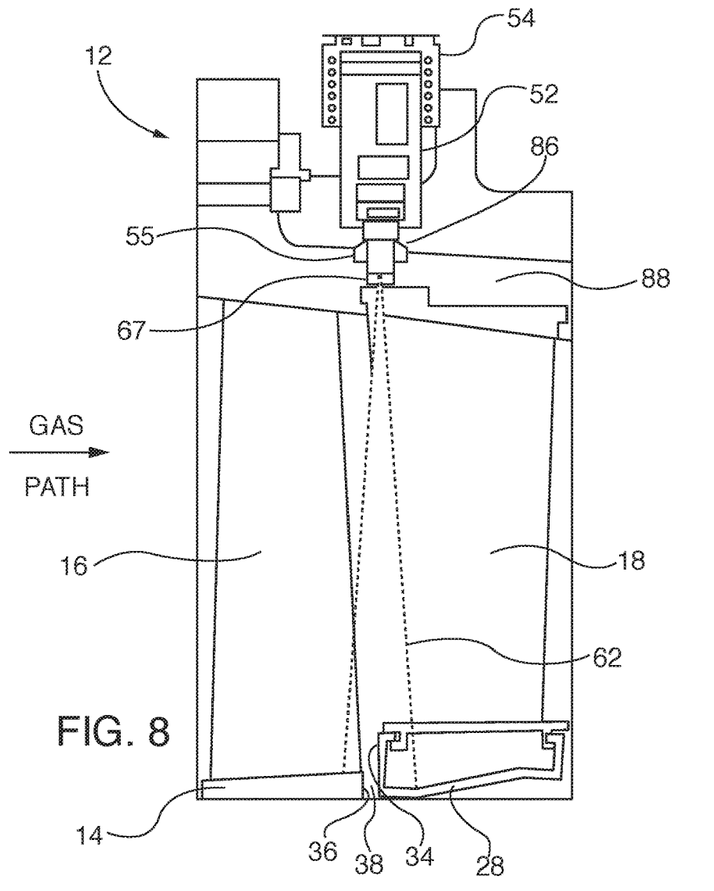
FIG. 8 is a partial cross sectional view of a compressor section and depicts an exemplary access port and enclosure.

Referring to FIG. 8, a partial cross sectional view of a compressor section 10 depicting an exemplary access port 86 and enclosure 54 is shown. In accordance with an aspect of the present invention, the compressor section 10 may include at least one custom access port 86 formed in the outer casing 12. The enclosure 54, including the camera 52, is removeably attached to the access port 86 by the attachment portion 55. The access port 86 is positioned relative to the casing 12 to enable the capture of images of the gap 38 and/or at least one associated component by the camera 52. In an embodiment, the compressor section 10 may include a plurality of access ports 86 positioned in a circumferential and/or staggered arrangement around the outer casing 12. Alternatively, the enclosure 54 may be removeably attached to a preexisting inspection port located about a gas turbine periphery.

The access port 86 includes a through hole 64 that provides access to an interior 88 of the compressor section 10 such that the gap 38, upstream face 34 of seal holder 28 and downstream face 36 of adjacent disk 14 are within the field of view 62 of the camera 52. This enables the capture of images of the gap 38 and at least portions of the upstream face 34 and downstream face 36 by the camera 52 without removal of the outer casing 12 or other disassembly of the gas turbine.

As previously described, at least one area or region of the outer hook 26 becomes worn (i.e. either the upstream 40 and downstream 42 wear regions or both) which causes the gap 38 to undesirably become smaller over time during gas turbine operation and may result in undesirable contact 48 (see FIG. 3) between the seal holder 28 and the 14 disk. It is desirable to continuously monitor the compressor diaphragm hook wear to assess the wear rate of the outer hook 26 (in addition to monitoring any surface cracks, other flaws, chipping of coating etc.) while a gas turbine is in operation to ensure safe operation of the gas turbine. This is particularly important given the ever-growing demand to extend gas turbine operating/inspection intervals as well as increase the firing temperature for higher gas turbine efficiency/output.

Figure 9A:
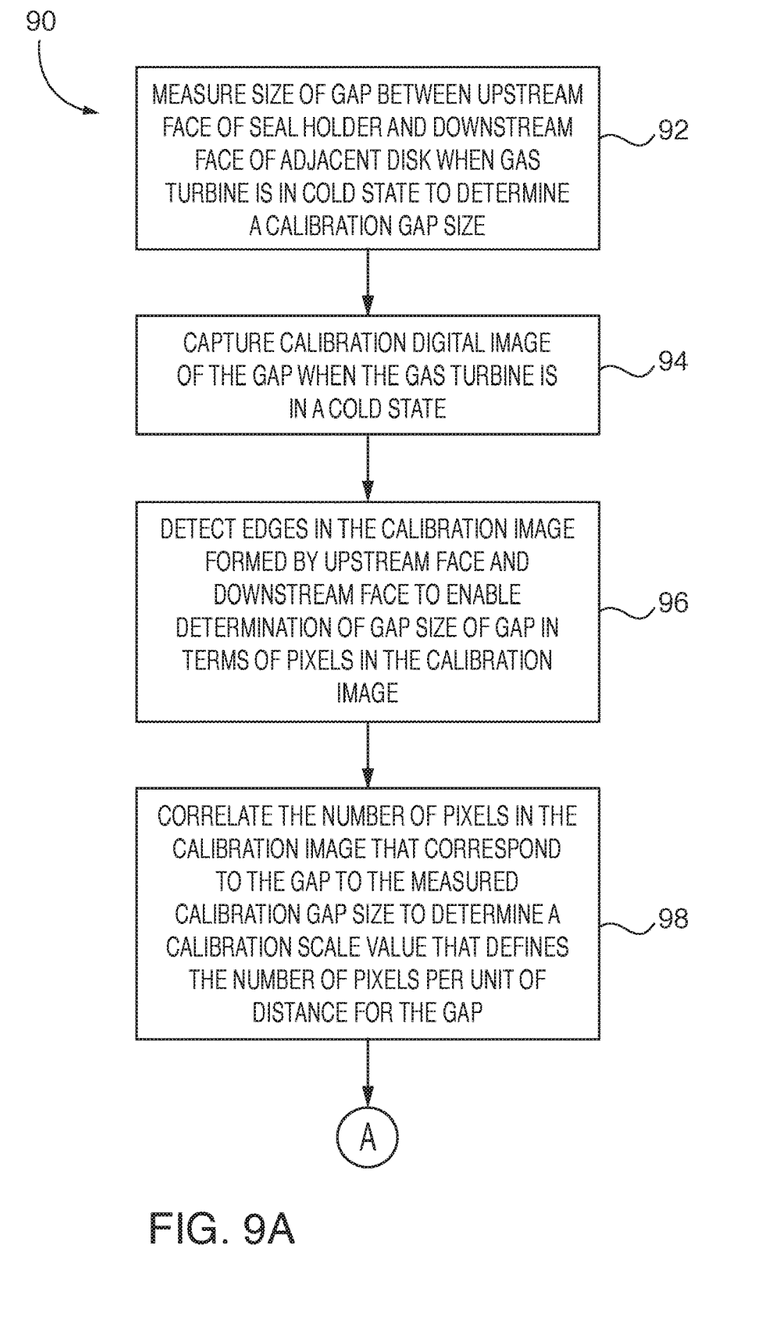
FIGS. 9A-9C illustrate a method for monitoring a size of the gap.
Figure 9B:
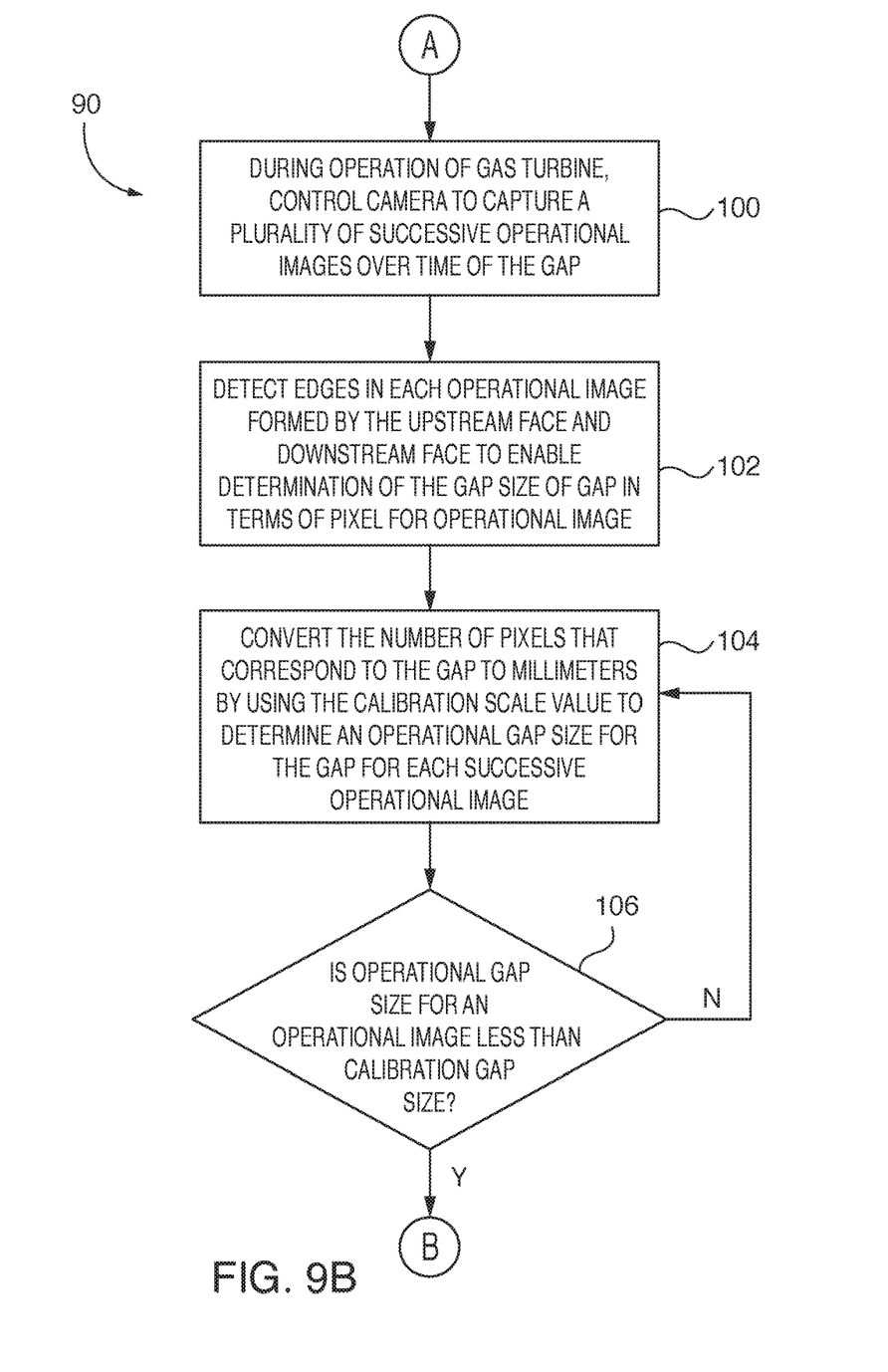
Figure 9C:
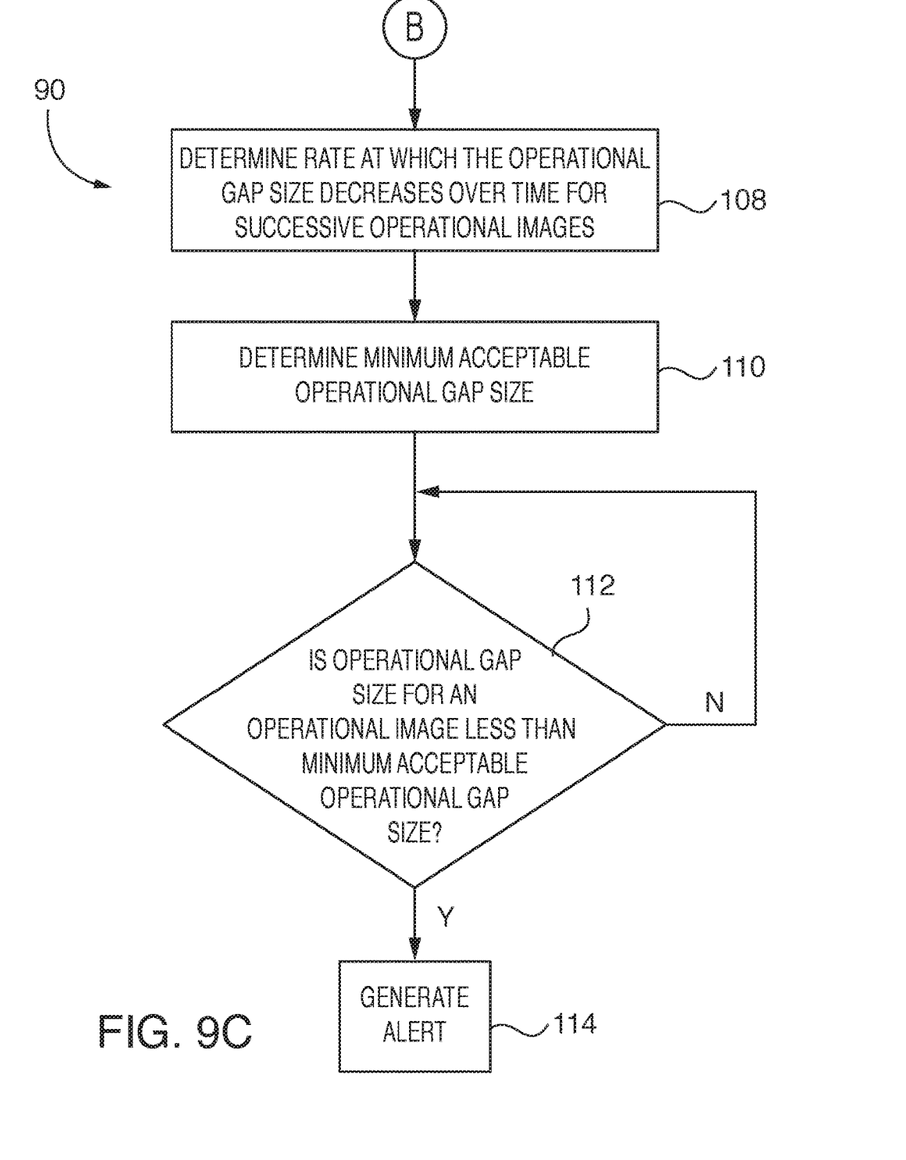

Referring to FIGS. 9A-9C, a method 90 for monitoring a size of the gap 38 will now be described. In accordance with an aspect of the present invention, the size of the gap 38 between the upstream face 34 of seal holder 28 and downstream face 36 of adjacent disk 14 is physically measured when the gas turbine is in a cold state to determine a calibration gap size at Step 92. For example, the gas turbine is in a cold state after the turbine has been shut down and allowed to cool off for a predetermined time period. Alternatively, the calibration gap size may be measured during manufacture/assembly of the compression section. In addition, a calibration digital image of the gap 38 is captured by the camera 52 when the gas turbine is in the cold state at Step 94. At Step 96, a known edge detection algorithm is then used to detect the edges in calibration image formed by the upstream face 34 and downstream face 36 to enable determination of the gap size of gap 38 in terms of pixels. At Step 98, the number of pixels in the calibration image that correspond to the gap 38 is then correlated to the physically measured calibration gap size to determine a calibration scale value that defines the number of pixels per unit of distance (for example, number of pixels per millimeter) for the gap 38.

During operation of the gas turbine, the camera 52 is controlled by a computer 120 as will be described and associated software to capture a plurality of successive operational digital images over time of the gap 38 as the compressor blades 16 rotate at Step 100. At Step 102, the edge detection algorithm is then used to detect the edges in each operational image formed by the upstream face 34 and downstream face 36 to enable determination of the gap size of gap 38 in terms of pixels for each operational image. At Step 104, the number of pixels that correspond to the gap 38 is then converted to millimeters by using the calibration scale value to determine an operational gap size for the gap 38 for each successive operational image. The operational gap size for each operational image captured over time is then monitored to determine whether the operational gap size decreases relative to the calibration gap size during operation of the gas turbine therefore indicating that wear is occurring in at least one region of the outer hook 26. At Step 106, if the operational gap size for an operational image is less than the calibration gap size, the rate at which the operational gap size decreases over time for successive operational images is determined at Step 108. If the operational gap size for an operational image is not less than the calibration gap size, the operational gap size for a successive operational image is determined at Step 104. Next, a minimum acceptable operational gap size for operating the gas turbine is determined at Step 110. If the operational gap size for an operational image is less than the minimum acceptable operational gap size at Step 112, an alert is generated at Step 114 for the operator to take action such as shutting down the gas turbine. Additionally, at least one warning may be generated as the operational gap size decreases over time and approaches the minimum acceptable gap size. For example, a warning may be generated if the operational gap size does not exceed the minimum acceptable gap size by a predetermined amount.

In use, aspects of the present invention may be installed on any custom engine access port for "quick look" onsite monitoring of stationary or rotating components. Information regarding gap size and any other surface flaws may be stored in a data acquisition system 122 that can be used to continuously monitor the gas turbine. In addition, the images may be sent to a remote server for further analysis. The present invention serves as a gas turbine engine health monitoring arrangement wherein a status of hook wear can be determined during operation (i.e. on the fly) without having to wait for a scheduled maintenance an outage, thus enabling faster decision making as to whether to replace a part (if needed). In addition, the present invention enables longer inspection intervals while also enhancing the ability to meet ever-increasing demands for increases in firing temperature for a gas turbine without significant changes to existing gas turbine metallurgy. Further, the present invention may also be used to capture images of stationary gas turbine components.

Figure 10:
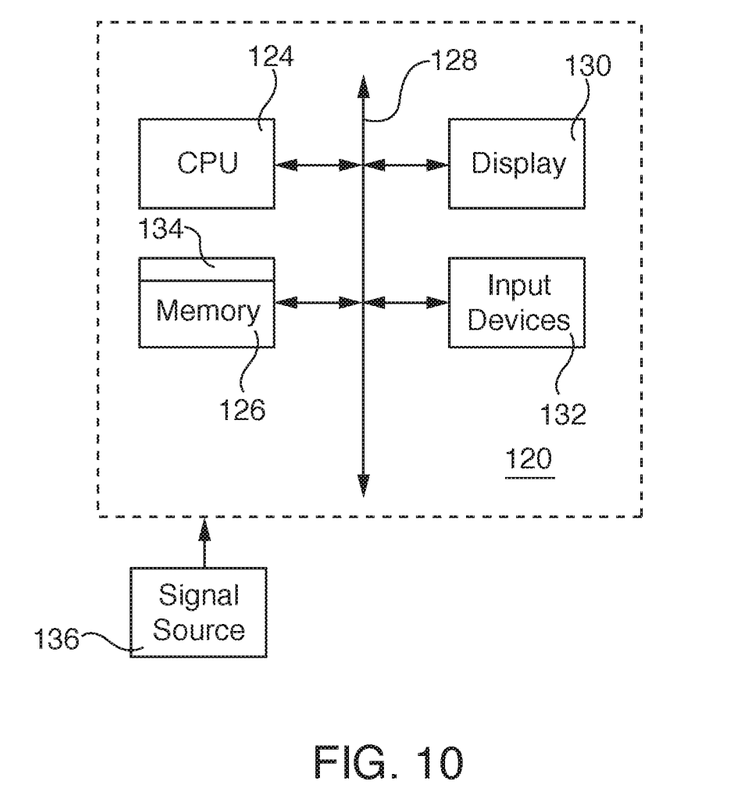
FIG. 10 is a high level block diagram of a computer.

Referring back to FIG. 4, the camera 52, flash power supply 76 and data acquisition system 122 are communicatively coupled to the computer 120 by a wired connection 78 or a wireless connection. The computer 120 includes software and drivers for controlling operation of the camera 52, flash power supply 76, flash source 74 and data acquisition system 122. The computer 120 may use well-known computer processors, memory units, storage devices, computer software, and other components. A high level block diagram of such a computer is illustrated in FIG. 10. Computer 120 may include a central processing unit (CPU) 124, a memory 126 and an input/output (I/O) interface 128. The computer 120 is generally coupled through the I/O interface 128 to a display 130 for visualization and various input devices 132 that enable user interaction with the computer 120 such as a keyboard, keypad, touchpad, touchscreen, mouse, speakers, buttons or any combination thereof. Support circuits may include circuits such as cache, power supplies, clock circuits, and a communications bus. The memory 126 may include random access memory (RAM), read only memory (ROM), disk drive, tape drive, etc., or a combination thereof. Embodiments of the present disclosure may be implemented as a routine 134 that is stored in memory 126 and executed by the CPU 124 to process the signal from a signal source 136. As such, the computer 120 is a general purpose computer system that becomes a specific purpose computer system when executing the routine 134. The computer 120 can communicate with one or more networks such as a local area network (LAN), a general wide area network (WAN), and/or a public network (e.g., the Internet) via a network adapter. One skilled in the art will recognize that an implementation of an actual computer could contain other components as well, and that FIG. 10 is a high level representation of some of the components of such a computer for illustrative purposes.

The computer 120 also includes an operating system and micro-instruction code. The various processes and functions described herein may either be part of the micro-instruction code or part of the application program (or a combination thereof) which is executed via the operating system. In addition, various other peripheral devices may be connected to the computer platform such as an additional data storage device and a printing device. Examples of well-known computing systems, environments, and/or configurations that may be suitable for use with computer 120 include, but are not limited to, personal computer systems, server computer systems, thin clients, thick clients, hand-held or laptop devices, multiprocessor systems, microprocessor-based systems, set top boxes, programmable consumer electronics, network PCs, minicomputer systems, mainframe computer systems, and distributed cloud computing environments that include any of the above systems or devices, and the like.

In some examples, the computer 120 is disposed within and considered a part of camera 52 or display 130. In still other examples, the computer 120 may be co-located in both camera 52 and display 130. In some examples, full 2D images of a turbine component, that is, composite 2D images that include all 350 degrees or some other desired portion of the external surfaces of the turbine component, are compiled from a plurality of individual images or exposures obtained by camera 52 for subsequent inspection by a qualified NDE inspector/operator. In addition, in some examples, the computer 120 is configured to combine a plurality of images of the turbine component captured by camera 52, and form a composite image reflecting the image data of each of the plurality of images.

While particular embodiments of the present disclosure have been illustrated and described, it would be obvious to those skilled in the art that various other changes and modifications can be made without departing from the spirit and scope of the disclosure. It is therefore intended to cover in the appended claims all such changes and modifications that are within the scope of this disclosure.

What is claimed is:

1. A system for monitoring a gap size of a gap between a seal holder and an adjacent disk in a compressor section of a gas turbine wherein the compressor section includes a hook section, comprising:

an imaging device that generates at least one image of the gap, wherein a calibration image of the gap is generated when the gas turbine is in a cold state to provide a calibration gap size and an operational image of the gap is generated when the gas turbine is in operation to provide an operational gap size and wherein wear is detected in the hook section when the operational gap size is less than the calibration gap size;

an enclosure that houses the imaging device wherein the enclosure includes an attachment portion; and an access port formed in the compressor section to provide a view of the gap for the imaging device, wherein the attachment portion is attached to the access port.

2. The system according to claim 1, further including measuring the gap between the seal holder and the disk and correlating a size of the gap with the calibration image of the gap to generate a calibration scale value.

3. The system according to claim 2, wherein the calibration scale value is used to determine the operational gap size.

4. The system according to claim 1, further including a borescope.

5. The system according to claim 4, further including a flash source located on an end of the borescope.

6. The system according to claim 5, wherein the flash source has an annular shape.

7. A method for monitoring a gap size of a gap between a seal holder and an adjacent disk in a compressor section of a gas turbine, comprising:

measuring the gap between the seal holder and the disk when the gas turbine is in a cold state to provide a calibration gap size;

generating an image of the gap when the gas turbine is in a cold state to provide a calibration image of the gap size;

correlating a number of pixels in the calibration image to the calibration gap size to determine a calibration scale value;

generating a plurality of successive operational images of the gap over time during operation of the gas turbine;

determining an operational gap size for each operational image by using the calibration scale value; and determining whether the operational gap size is less than the calibration gap size.

8. The method according to claim 7, further including detecting edges in the calibration image formed by the seal holder and the disk to enable determination of the gap size in terms of pixels in the calibration image.

9. The method according to claim 7, further including detecting edges in the operational images formed by the seal holder and the disk to enable determination of the gap size in terms of pixels for each operational image.

10. The method according to claim 7, further including determining a rate at which the operational gap size decreases over time for successive operational images.

11. The method according to claim 7, further including generating an alert if the operational gap size is less than the calibration gap size.

12. The method according to claim 7, further including generating a warning if the operational gap size does not exceed a minimum acceptable gap size by a predetermined amount.

13. The method according to claim 7, further including providing an access port in the compressor section to enable generation of the calibration and operational images.

14. The method according to claim 13, further including providing an enclosure having an imaging device wherein the enclosure includes an attachment portion that attaches to the access port.

15. A method for monitoring a gap size of a gap between a seal holder and an adjacent disk in a compressor section of a gas turbine wherein the compressor section includes a hook section, comprising:

measuring the gap between the seal holder and the disk when the gas turbine is in a cold state to provide a calibration gap size;

generating an image of the gap when the gas turbine is in a cold state to provide a calibration image of the gap size;

correlating a number of pixels in the calibration image to the calibration gap size to determine a calibration scale value;

generating a plurality of successive operational images of the gap over time during operation of the gas turbine;

determining an operational gap size for each operational image by using the calibration scale value;

determining whether the operational gap size is less than the calibration gap size wherein wear is detected in the hook section when the operational gap size is less than the calibration gap size; and determining a rate at which the operational gap size decreases over time for successive operational images.

16. The method according to claim 15, further including detecting edges in the calibration image formed by the seal holder and the disk to enable determination of the gap size in terms of pixels in the calibration image.

17. The method according to claim 15, further including detecting edges in the operational images formed by the seal holder and the disk to enable determination of the gap size in terms of pixels for each operational image.

18. The method according to claim 15, further including generating an alert if the operational gap size is less than the calibration gap size.

19. The method according to claim 15, further including generating a warning if the operational gap size does not exceed a minimum acceptable gap size by a predetermined amount.

20. The method according to claim 15, further including providing an access port in the compressor section to enable generation of the calibration and operational images.

* * * * *